United States Patent
Zhou et al.

(10) Patent No.: US 12,025,825 B2
(45) Date of Patent: Jul. 2, 2024

(54) LIGHT-EMITTING COMPOSITE FILM LAYER, BACKLIGHT MODULE, AND DISPLAY DEVICE

(71) Applicant: TCL China Star Optoelectronics Technology Co., Ltd., Guangdong (CN)

(72) Inventors: Miao Zhou, Guangdong (CN); Zihang Song, Guangdong (CN); Xue Bai, Guangdong (CN); Ji Li, Guangdong (CN); Xin Zhang, Guangdong (CN)

(73) Assignee: TCL China Star Optoelectronics Technology Co., Ltd., Shenzhen (CN)

(*) Notice: Subject to any disclaimer, the term of this patent is extended or adjusted under 35 U.S.C. 154(b) by 917 days.

(21) Appl. No.: 17/051,448

(22) PCT Filed: Jul. 27, 2020

(86) PCT No.: PCT/CN2020/104769
§ 371 (c)(1),
(2) Date: Oct. 29, 2020

(87) PCT Pub. No.: WO2021/174753
PCT Pub. Date: Sep. 10, 2021

(65) Prior Publication Data
US 2023/0161094 A1 May 25, 2023

(30) Foreign Application Priority Data
Mar. 6, 2020 (CN) .......................... 202010150047.1

(51) Int. Cl.
*C09K 11/02* (2006.01)
*C09K 11/70* (2006.01)
(Continued)

(52) U.S. Cl.
CPC ............ *G02B 6/0056* (2013.01); *C09K 11/02* (2013.01); *C09K 11/70* (2013.01); *C09K 11/883* (2013.01);
(Continued)

(58) Field of Classification Search
None
See application file for complete search history.

(56) References Cited

U.S. PATENT DOCUMENTS

| 2020/0133078 A1 | 4/2020 | Kim et al. |
| 2020/0225521 A1 | 7/2020 | Lee et al. |

FOREIGN PATENT DOCUMENTS

| CN | 103487857 | 1/2014 |
| CN | 108828836 | 11/2018 |

(Continued)

*Primary Examiner* — Robert E. Tallman

(57) ABSTRACT

The invention provides a light-emitting composite film layer, a backlight module, and a display device. The light-emitting composite film layer includes a quantum dot film layer and a diffusion film layer. The diffusion film layer is disposed on at least one surface of the quantum dot film layer. Quantum dots and light diffusion particles are dispersed in the quantum dot film layer. The quantum dots include green light and red light quantum dots, and light diffusion particles are dispersed in the diffusion film layer. The invention makes blue light divergent, makes the blue light reach same brightness viewing angles as red light and green light, and reduces or even eliminates color cast.

15 Claims, 3 Drawing Sheets

(51) Int. Cl.
*C09K 11/88* (2006.01)
*F21V 8/00* (2006.01)
*G02B 5/20* (2006.01)
*B82Y 20/00* (2011.01)

(52) U.S. Cl.
CPC ........... *G02B 5/206* (2013.01); *G02B 6/0051* (2013.01); *G02B 6/0073* (2013.01); *B82Y 20/00* (2013.01); *G02B 2207/101* (2013.01)

(56) References Cited

FOREIGN PATENT DOCUMENTS

| | | |
|---|---|---|
| CN | 110780488 | 2/2020 |
| CN | 110794503 | 2/2020 |
| CN | 111103727 | 5/2020 |
| CN | 111435206 | 7/2020 |
| JP | 2017-019971 | 1/2017 |
| JP | 6627298 | 1/2020 |
| JP | 6627298 B2 * | 1/2020 |

* cited by examiner

LIGHT-EMITTING COMPOSITE FILM LAYER, BACKLIGHT MODULE, AND DISPLAY DEVICE

RELATED APPLICATIONS

This application is a National Phase of PCT Patent Application No. PCT/CN2020/104769 having International filing date of Jul. 27, 2020, which claims the benefit of priority of Chinese Patent Application No. 202010150047.1 filed on Mar. 6, 2020. The contents of the above applications are all incorporated by reference as if fully set forth herein in their entirety.

FIELD AND BACKGROUND OF THE INVENTION

The present invention relates to the field of semiconductor technology, and more particularly, to a light-emitting composite film layer, a backlight module, and a display device.

Quantum dots (QDs) are semiconductor nanocrystalline material composed of dozens of atoms. Their three-dimensional sizes are all within 100 nanometers, and they can produce light with a specific wavelength in their electronic excited states. QDs with different material compositions or different sizes have different light emission wavelengths. Because QDs have smaller particle sizes less than or close to an exciton Bohr radius, their internal electron transport is limited, limitation and coherence of electrons are enhanced, a quantum confinement effect is significant, and their continuous band structures become discrete level structures with molecular properties, so that the QDs with different sizes have different electron and hole confinement levels. Therefore, after being excited by external energy, electron transition will occur and fluorescence will be emitted, and the quantum dots with different sizes will emit different colors of light. The larger the size, the larger the peak position of the emitted light. In addition, because an energy level band gap of QDs is greatly affected by their sizes, light of different wavelengths can be excited by adjusting the sizes of the QDs or using QDs consisting of different compositions. QDs have been widely used in lighting and display fields due to their excellent properties such as narrow half-peak width, high luminous purity, and adjustable emission wavelength with their sizes. Display technology has experienced continuous development from thick to thin, black and white to color, and clear to high definition. These include early cathode ray tube technology and plasma display technology, as well as today's mainstream organic light-emitting diode display technology and liquid crystal display technology. The information people get from display devices requires not only simple digits and images, but also excellent color performance. The use of the quantum dot technology to convert light emitted from various light sources (for example, liquid crystal displays (LCDs) backlights, light-emitting diodes (LEDs), and OLED emitting layers) has become a focus of display development. In 2013, quantum dots were formally applied to LCDs, their color gamut is greater than that of LCDs, and have "vividness" equal to or better than organic light-emitting diodes (OLEDs). At beginning of 2018, SAMSUNG started to develop QD OLED. In QD OLED, a blue light-emitting material is evaporated onto a high mobility thin film transistor (TFT) panel. QD material is used to convert blue light to red (R) light and green (G) light to generate RGB sub-pixels. Compared with other OLED display technologies, QD OLED has similar or greater performance in terms of high contrast, true black, fast response times, wide viewing angles, and wide color gamut. Quantum dots are used in the field of display technology, and with the help of quantum dots, high-quality red/green monochromatic light with concentrated energy spectrum can be emitted, which surpasses light-emitting characteristics of traditional LED backlight phosphors. Display devices using this technology can effectively raise color threshold of displays and make colors more pure and vivid. A quantum dot film (QD-film) is excited by a blue LED backlight and blue light is mixed to form white backlight. This is the most common application of quantum dot display technology. However, since brightness viewing angles of red and green (R/G) quantum dot excitation light are extremely wide, brightness viewing angles of the blue LED are significantly different from those of red and green. Therefore, a phenomenon of large viewing angle color cast will occur in the application of QD-film in displays.

Technical Problem

An embodiment of the present invention provides a light-emitting composite film layer, a backlight module, and a display device. The light-emitting composite film layer includes a quantum dot film layer and a diffusion film layer covering at least one surface of the quantum dot film layer. Green quantum dots, red light quantum dots, and light diffusion particles are dispersed in the quantum dot film, and light diffusion particles are dispersed in the diffusion film layer. Light diffusion effect of light-diffusing particles is utilized to make blue light divergent to achieve the same brightness viewing angles as the red light and green light quantum dots, reduce color cast and even eliminate color cast to solve the problem of color cast at large viewing angles that occurs when the conventional quantum dot film (QD-film) is applied to a display.

SUMMARY OF THE INVENTION

For this purpose, an embodiment of the present invention provides the following technical solutions.

A first aspect of the present invention provides a light-emitting composite film layer. The light-emitting composite film layer includes a quantum dot film layer and a diffusion film layer, wherein the diffusion film layer is disposed on at least one surface of the quantum dot film layer. The quantum dot film layer includes quantum dots and light diffusion particles dispersed therein, and the quantum dots include green light quantum dots and red light quantum dots, and the diffusion film layer includes the light diffusion particles dispersed therein, and the light diffusion particles are inorganic nano-material having a refractive index greater than 2.0.

Further, the green light quantum dot includes a luminescence nuclei including one or more of $ZnCdSe_2$, InP, and $Cd_2SSe$, an inorganic protective shell including one or more of CdS, ZnSe, $ZnCdS_2$, ZnS, and ZnO, and a surface ligand including one or more of amine, organic acid, mercaptan, and organic phosphorus. The red light quantum dots include a luminescence nuclei including one or more of CdSe, $Cd_2SeTe$, and InAs, an inorganic protective shell including one or more of CdS, ZnSe, $ZnCdS_2$, ZnS, and ZnO, and a surface ligand including one or more of amine, organic acid, mercaptan, and organic phosphorus.

Further, the light diffusion particles are one or more of $TiO_2$, ZnS, and $ZrO_2$.

Further, the quantum dot film layer is obtained by adding the quantum dots, the light diffusion particles, a dispersant, and a first diluent to a first dispersion medium and mixing them uniformly, and mass of the quantum dots is 0.05 to 2.0 weight % of total mass of the quantum dot film layer, mass of the light diffusion particles in the quantum dot film layer is 0.02 to 2.0 weight % of total mass of the quantum dot film layer, mass of the first dispersion medium is 30 to 70 weight % of total mass of the quantum dot film layer, mass of the dispersant is 30 to 70 weight % of total mass of the quantum dot film layer, and mass of the diluent is 30 to 70 weight % of total mass of the quantum dot film layer.

Further, the first dispersion medium is a pressure-sensitive adhesive or a resin, the dispersant is alkane, olefin, toluene, chloroform or propylene glycol methyl ether acetate, and the first diluent is ethyl acetate.

Further, the diffusion film layer is obtained by adding the light diffusion particles and a second diluent to a second dispersion medium and mixing them uniformly, mass of the light diffusion particles in the diffusion film layer is 0.02 to 2.0 weight % of total mass of the diffusion film layer, mass of the second diluent is 30 to 70 weight % of total mass of the diffusion film layer, and mass of the second dispersion medium is 30 to 70 weight % of total mass of the diffusion film layer.

Further, the second dispersion medium is polyvinyl alcohol, polysulfone amide, or resin, and the second diluent is water or alkane.

Further, a water-oxygen barrier layer is further disposed between the quantum dot film layer and the diffusion film layer.

A second aspect of the present invention provides a backlight module. The backlight module includes the light-emitting composite film layer according to the first aspect.

A third aspect of the present invention provides a display device. The display device includes the backlight module according to the second aspect.

Beneficial Effect

The beneficial effects of the present invention are: the light-emitting composite film layer provided by the present invention includes a quantum dot film and a diffusion film layer covering at least one surface of the quantum dot film. The quantum dot film is dispersed with green light quantum dots, red light quantum dots, and light diffusion particles therein, and the diffusion film layer is dispersed with light diffusion particles therein. Light diffusion effect of light-diffusing particles is utilized to make blue light divergent to achieve the same brightness viewing angles as the red light and green light quantum dots, thereby reducing color cast and even eliminating color cast.

BRIEF DESCRIPTION OF THE SEVERAL VIEWS OF THE DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

DESCRIPTION OF SPECIFIC EMBODIMENTS OF THE INVENTION

Figure 1:
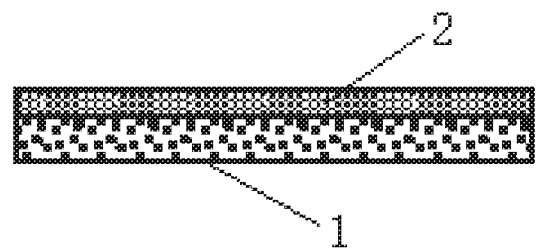
FIG. 1 is a schematic structural diagram of an embodiment of a light-emitting composite film layer provided by the present invention.

The technical solution of a light-emitting composite film layer, a backlight module and a display device provided by the present invention will be clearly and completely described with reference to the accompanying drawings. Obviously, the described embodiments are only a part of the embodiments of the present invention, but not all the embodiments. Based on embodiments of the present invention, all other embodiments obtained by those skilled in the art without creative work fall into the protection scope of the present invention.

In the present invention, the term "exemplary" is used to mean "serving as an example, citation, or illustration." Any embodiment described herein as "exemplary" is not necessarily to be construed as preferred or advantageous over other embodiments. In order to enable any person skilled in the art to implement and use the present invention, the following description is given. In the following description, the invention is set forth in detail for the purpose of explanation. It should be understood by those of ordinary skill in the art that the present invention can be implemented even without using these specific details. In other embodiment, well-known structures and procedures will not be described in detail in order to avoid unnecessary details from obscuring the description of the present invention. Therefore, the present invention is not intended to be limited to the illustrated embodiments, but should be consistent with the widest scope consistent with the principles and features disclosed by the present invention.

It should be understood that the terms described in the present invention are only used to describe specific embodiments and are not used to limit the present invention. In addition, the numerical range in the present invention should be understood as specifically disclosing the upper and lower limits of the range and each intermediate value therebetween. Intermediate value within any stated value or stated range and any other stated value or any smaller range between the intermediate values within the stated range is also included in the invention. The upper and lower limits of these smaller ranges may be independently included or excluded from the range. The "%" in the present invention represents a mass percentage unless otherwise specified.

Unless defined otherwise, all technical and scientific terms used herein have the same meaning as commonly understood by one of ordinary skill in the art to which this invention belongs. Although the present invention describes only preferred methods and materials, any methods and materials similar or equivalent to those described herein can also be used in the practice or testing of the present invention. All documents mentioned in the specification are incorporated by reference to disclose and describe the methods and/or materials associated with the documents. In case of conflict with any incorporated document, the content of the specification shall prevail.

In addition, the terms "first", "second", "third", etc. are used for descriptive purposes only, and should not be interpreted as indicating or suggesting relative importance or implicitly indicating the number of technical features indicated. Therefore, the features defined as "first", "second", and "third" may explicitly or implicitly include one or more features. In the description of the present invention, the meaning of "plurality" is two or more, unless specifically defined otherwise.

In the prior art, when a quantum dot film (QD-film) is applied to the display field, its principle is that red light, green light, and blue light emitted by a quantum dot after being excited by a blue LED backlight are mixed into white. However, because the red and green brightness viewing angle of the quantum dot excitation light is extremely large, the brightness viewing angle of the blue LEDs are significantly different from those of the red light and green light, and large viewing angle deviations may occur. In view of this problem, the present invention provides an optical multilayer composite film, which disperses a certain concentration of light-diffusing particles in an organic polymer, and coats the film to form a diffusion film layer. Then it is coated on the quantum dot film layer which is also dispersed with light-diffusing particles to improve the light type difference between the red light and green light of the quantum dot and the blue backlight and reduce or even eliminate large viewing angle deviations.

Figure 2:
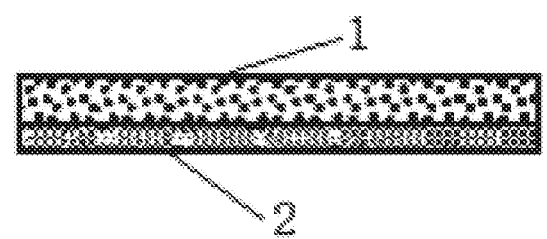
FIG. 2 is a schematic structural diagram of another embodiment of a light-emitting composite film layer provided by the present invention.
Figure 3:
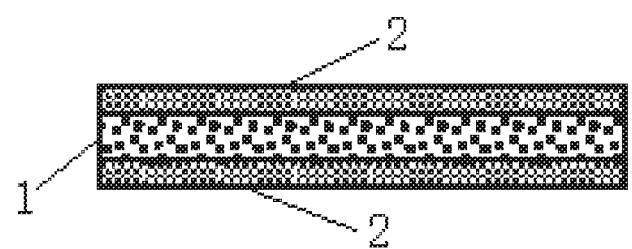
FIG. 3 is a schematic structural diagram of a third embodiment of a light-emitting composite film layer provided by the present invention.

Specifically, please refer to FIG. 1, FIG. 2, and FIG. 3. An embodiment of the present invention provides a light-emitting composite film layer, which includes a quantum dot film layer 1 and a diffusion film layer 2. The diffusion film layer 2 is disposed on at least one surface of the quantum dot film layer 1. Quantum dot films and light-diffusing particles are dispersed in the quantum dot film layer. The quantum dots include green light quantum dots and red light quantum dots. Light-diffusing particles are dispersed in the diffusion film layer, and the light-diffusing particles are inorganic nanomaterials having a refractive index greater than 2.0.

Shown in FIG. 1 is a schematic structural diagram of an embodiment of a light-emitting composite film layer provided by the present invention. A diffusion film layer 2 covers an upper surface of the quantum dot film layer 1.

Shown in FIG. 2 is a schematic structural diagram of another embodiment of a light-emitting composite film layer provided by the present invention. A diffusion film layer 2 covers a lower surface of the quantum dot film layer 1.

Shown in FIG. 3 is a schematic structural diagram of a third embodiment of the light-emitting composite film layer provided by the present invention. The upper and lower surfaces of the quantum dot film layer 1 are covered with a diffusion film layer so that the diffusion particles have a better effect on the divergence of blue light, effectively reducing or even eliminating large viewing angle color cast.

Quantum dots have the following three characteristics: quantum size effect, surface effect, and quantum tunneling effect. The quantum size effect, also known as quantum confinement effect, refers to a fact that in semiconductor nanomaterials, when a size of a quantum dot is reduced to less than or close to an exciton Bohr radius, movement of electrons will be constrained to cause energy splitting and an increase in bandgap. The surface effect means that as a size of semiconductor nanoparticles decreases, a specific surface area (surface area/volume) increases significantly. A ratio of a number of atoms on a surface of the nanoparticles to a total number of atoms thereof has increased sharply. This leads to changes in properties of quantum dots and an increase in bonds, as well as a rapid increase in surface activity and surface energy of nanoparticles. These will increase surface defects of the nanoparticles and increase their activity, making them prone to combine with other atoms. The generation of surface defects often causes quenching of quantum dot luminescence, which destroys its luminous efficiency. Thus, in preparation of quantum dots, surface modification is usually required on the quantum dots. For example, using a wide bandgap semiconductor material to coat the particles with a shell to repair surface dangling bonds and eliminate non-radiative recombination centers. Therefore, the quantum dot of the present invention adopts a ligand structure composed of a light-emitting core, a conductor shell, and a wide-gap organic compound coated on the shell to prevent non-radiative recombination due to an increase in unsaturated dangling bonds on the surface of the quantum dot, thereby reducing luminous efficiency. Quantum tunneling effect is as follows: assume that a particle with certain energy moves from the left side to the right side of the barrier. In classical mechanics, only particles with energy greater than the barrier can cross the barrier to the right, and particles with energy less than the barrier are reflected and cannot pass through the barrier. However, in quantum mechanics, the situation is different. Because the particles show obvious fluctuations, not only particles with energy greater than the barrier can pass, but particles with energy less than the barrier also have a certain probability to cross the barrier to the right. In this situation, the phenomenon that particles with energy lower than the barrier height can still penetrate the barrier is called the quantum tunneling effect. In addition to the above three characteristics, quantum dots also exhibit some other characteristics, such as the Coulomb blocking effect, quantum interference effect, multibody correlation, and nonlinear effects, etc. Based on these characteristics of the quantum dots, the present invention has a special design for component selection and preparation method of the quantum dots to ensure excellent optical performance of the quantum dot film.

In the present invention, the term "green light quantum dot" can also be called "green quantum dot", which emits green light when excited and the term "red light quantum dot" can also be called "red quantum dot", which emits red light when excited. The shell and layer of a quantum dot have a great influence on the light-emitting properties of the quantum dot (such as fluorescence peak position, fluorescence quantum yield, light stability, fluorescence full width at half maximum, etc.). In the preparation of core/shell structure quantum dots, the degree of lattice constant mismatch between the core material and the shell material needs to be considered. If the difference in lattice constants is small, the shell is grown in epitaxial growth mode. When the difference in lattice constants is large, epitaxial growth is difficult to carry out, and the shell will cause a formation of lattice dislocations and defects, destroy a shape structure of the quantum dots, and cause fluorescence yield to decrease. During a coating process of a quantum dot shell, the fluorescence peak position often changes. In addition, the increase of thickness of the shell also makes the size distribution of the quantum dots larger. As a result, the fluorescence full width at half maximum of the quantum dots becomes larger. Therefore, the present invention comprehensively considers the above factors, and the green light quantum dots and the red light quantum dots are provided with the light-emitting shell and the inorganic protective shell material so that the quantum dot film finally obtained has excellent optical properties. The green light quantum dots include a luminescence nuclei including one or more of $ZnCdSe_2$, InP, and $Cd_2SSe$, an inorganic protective shell including one or more of CdS, ZnSe, $ZnCdS_2$, ZnS, and ZnO, and a surface ligand including one or more of amine, organic acid, mercaptan, and organic phosphorus. The red light quantum dots include a luminescence nuclei including one or more of CdSe, $Cd_2SeTe$, and InAs, an inorganic protective shell comprising one or more of CdS, ZnSe, $ZnCdS_2$, ZnS, and ZnO, and a surface ligand comprising one or more of amine, organic acid, mercaptan, and organic phosphorus.

Light-diffusing particles are inorganic nanomaterial with a refractive index greater than 2.0. The type of inorganic nanomaterial can be selected according to actual needs, and it is preferably one or more of $TiO_2$, ZnS, and $ZrO_2$. The above-mentioned preferred inorganic nanomaterial can more effectively transmit red light and green light, and have a scattering effect on blue light, eliminate the light type difference between the blue backlight and the red and green light of the quantum dots, and reduce or even eliminate the large viewing angle color cast. The light-diffusing particles can be spherical or irregularly shaped particles. Those skilled in the art can select a particle size of the light-diffusing particles according to actual needs. Preferably, the particle size of the inorganic nanomaterial is less than 50 nm, and is more preferably less than 20 nm. The light-diffusing particles can also be a micron-scale inorganic material.

The quantum dot film layer is obtained by adding the quantum dots, the light diffusion particles, a dispersant, and a first diluent to a first dispersion medium and mixing them uniformly. Mass of the quantum dots is 0.05 to 2.0 weight % of total mass of the quantum dot film layer, and is more preferably 1.0 weight %, and a molar ratio of the red quantum dots to the green quantum dots is preferably 1:1. Those skilled in the art can also set the molar ratio of red quantum dots to green quantum dots according to actual needs. Mass of the light diffusion particles in the quantum dot film layer is 0.02 to 2.0 weight % of total mass of the quantum dot film layer, and is more preferably 1.0 weight %. Mass of the first dispersion medium is 30 to 70 weight % of total mass of the quantum dot film layer, mass of the dispersant is 30 to 70 weight % of total mass of the quantum dot film layer, and mass of the first diluent is 30 to 70 weight % of total mass of the quantum dot film layer. A concentration of the quantum dots ensures that the quantum dot film has excellent optical properties.

The quantum dot itself is an inorganic nanocrystalline material, which needs to be kept uniformly dispersed to achieve uniform light emission. The dispersion of quantum dots in an embodiment of the present invention has two steps: in a first step, the quantum dots are dispersed ultrasonically in a dispersion medium, and the ultrasound-cooling-continued ultrasound process is continued until the solution becomes clear without precipitation and agglomeration. In a second step, the dispersion medium and the quantum dots are continued to be ultrasonically mixed until the dispersion is uniform and non-agglomerated.

In some embodiments, the method of preparing the quantum dot film layer includes: in a first step, red quantum dots are dispersed ultrasonically in a dispersion medium, and an ultrasound-cooling-continued ultrasound process is continued until the solution becomes clear without precipitation and agglomeration. At the same time, green quantum dots are dispersed ultrasonically in a dispersion medium, and the ultrasound-cooling-continued ultrasound process is continued until the solution becomes clear without precipitation and agglomeration. In a second step, continue to ultrasonically mix the red quantum dots and the green quantum dots fully dispersed in the dispersion medium, the dispersant, and the first diluent until the dispersion is uniform and non-agglomerated to obtain a preset concentration of a quantum dot solution, and the quantum dot solution is coated into a quantum dot film.

In other embodiments, a method of preparing a quantum dot film layer includes: in a first step, the red quantum dots and the green dots are dispersed ultrasonically in a dispersion medium at the same time, and the ultrasound-cooling-continued ultrasound process is continued until the solution becomes clear without precipitation and agglomeration. In a second step, continue to ultrasonically mix the red quantum dots and the green quantum dots fully dispersed in the dispersion medium, the dispersant, and the first diluent until the dispersion is uniform and non-agglomerated to obtain a preset concentration of a quantum dot solution, and the quantum dot solution is coated on a substrate into a quantum dot film.

In the present embodiment, the first dispersion medium is a pressure-sensitive adhesive or resin. The type of the pressure-sensitive adhesive can be selected by those skilled in the art according to actual needs, preferably a resin-based pressure-sensitive adhesive, more preferably an acrylic pressure-sensitive adhesive, a silicone-based pressure-sensitive adhesive, or a polyurethane-based pressure-sensitive adhesive. The dispersant is alkane, olefin, toluene, chloroform, or propylene glycol methyl ether acetate. The dispersant promotes better dispersion of red quantum dots and green quantum dots in the dispersion medium. The first diluent is ethyl acetate, and the quantum dot solution is diluted to a preset concentration.

The diffusion film layer is obtained by adding light diffusion particles and a second diluent to a second dispersion medium and mixing them uniformly. Specifically, the inorganic nanomaterial with a refractive index greater than 2.0 and the second diluent are ultrasonically dispersed in the second dispersion medium, and the ultrasound is continued until the dispersion is uniform. Mass of light-diffusing particles in the diffusion film layer is 0.02 to 2.0 weight % of a total mass of the diffusion film layer, mass of the second diluent is 30 to 70 weight % of total mass of the diffusion film layer, and mass of the second dispersion medium is 30 to 70 weight % of total mass of the diffusion film layer. The concentration of light-diffusing particles ensures effective divergence of blue light, reduces the difference between blue light type and red and green light, makes the blue light type unified with QD-excited red and green light, and eliminates color cast.

In some embodiments, a water-oxygen barrier layer is further disposed between the quantum dot film layer and the diffusion film layer. Since quantum dots are prone to quench when they encounter water and oxygen, the provision of a water-oxygen barrier layer can effectively overcome the defect of the quantum dots and ensure the optical stability of the light-emitting composite film layer. A material of the water-oxygen barrier layer can be selected according to actual needs. Preferably, the material of the water-oxygen barrier layer is an inorganic oxide or an organic oxide. More preferably, the water-oxygen barrier layer is aluminum oxide, silicon oxide, or a silicon oxide/chromium composite, which has a good barrier effect against water vapor and oxygen.

The light-emitting composite film layer of the embodiment can be used in a quantum dot polarizer (QD POL) or a quantum dot enhancement film (QD EF) backlight. The QD EF is an optical film added with two kinds of quantum dots. These two kinds of quantum dots can produce red light and green light under the irradiation of blue light and white light is obtained after mixing with a part of the transmitted blue light.

Figure 4A:
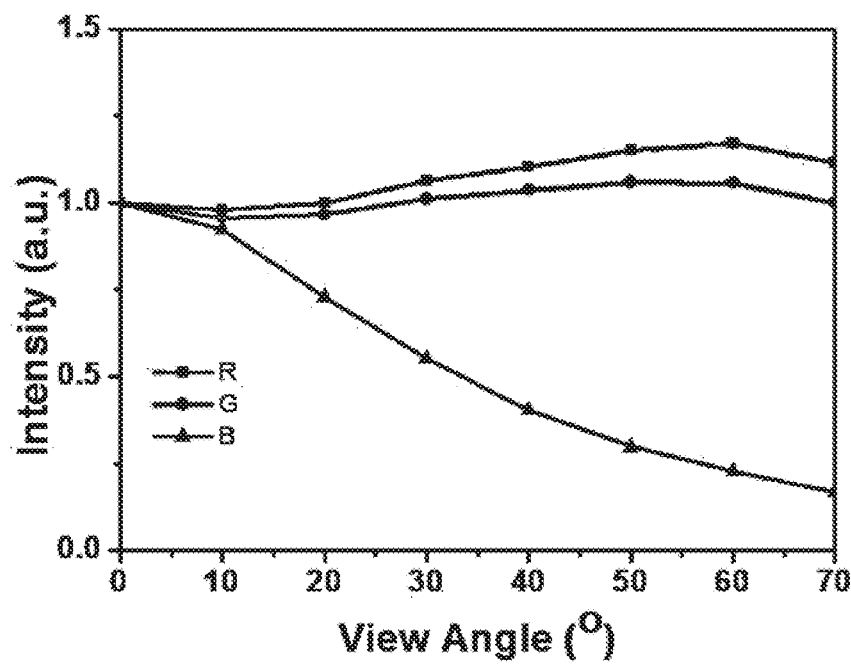
FIG. 4a is a red light, green light, and blue light curve model of a conventional quantum dot film excited by a blue LED backlight.
Figure 4B:
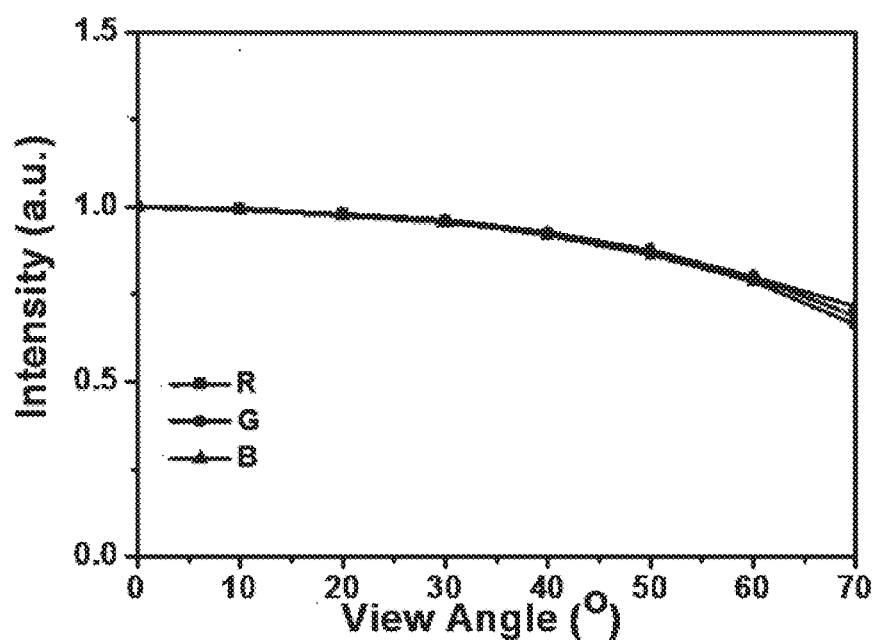
FIG. 4b is a red light, green light, and blue light curve model of a light-emitting composite film layer of the present invention after being excited by a blue LED backlight.

The quantum dot film in the prior art includes red quantum dots and green quantum dots. The light intensity diagram of the prior art quantum dot film under excitation of a blue LED backlight is shown in FIG. 4a. The light intensity diagram of the light-emitting composite film layer of the present invention under excitation of a blue LED backlight is shown in FIG. 4b. In the figure, R represents a red light type, G represents a green light type, and B represents a blue light type. Comparing FIG. 4a and FIG. 4b, in FIG. 4a, the blue light type is significantly different from red light and green light types, while the blue light type in FIG. 4b almost coincides with the red light and green light types. It can be known that the light-emitting composite film layer of the present invention is applied to display technology, which effectively improves the light type difference between the red-green light emitted by the quantum dots and the blue backlight, and basically eliminates color cast. In the figure, "View Angle" represents the viewing angle, and "Intensity" represents the light intensity.

Figure 5:
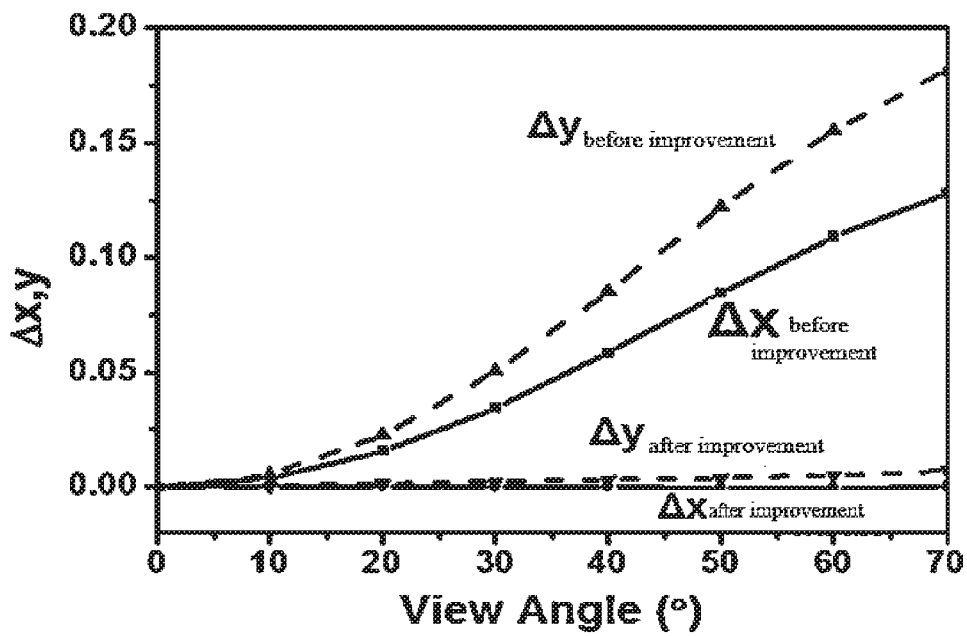
FIG. 5 is a comparison diagram of color points of a conventional quantum dot film and a light-emitting composite film layer after being excited by a blue LED backlight according to a change in viewing angle.

FIG. 5 is a comparison diagram showing the change of the color points in a quantum dot film and a light-emitting composite film layer of the prior art after being excited by a blue LED backlight with the change of viewing angles. In the diagram, ΔX and ΔY (before improvement) are the curves of color cast of the prior art quantum dot film with the change of viewing angles, and ΔX and ΔY (after improvement) are the curves of color cast of the quantum dot film of the present application with the change of viewing angles. It can be seen from the diagram that two curves ΔX and ΔY (after improvement) of the light-emitting composite film layer of the present invention almost coincide, and the curves are gentle. As the viewing angles increase, the color points are almost unchanged. It shows that the light-emitting composite film layer of the present invention effectively diverges blue light and almost eliminates color cast.

Figure 6:
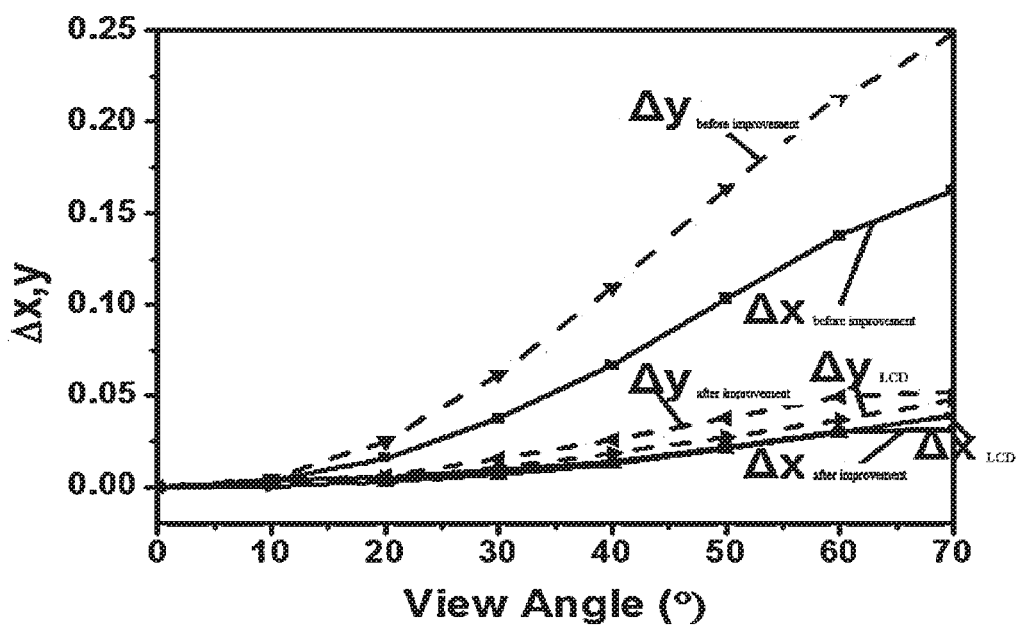
FIG. 6 is a color cast comparison diagram of a QD polarizer (POL) using a prior art quantum dot film, a QD polarizer using a light-emitting composite film layer of the present invention, and a liquid crystal display.

FIG. 6 is a color cast comparison diagram of a quantum dot polarizer (QD POL) using a prior art quantum dot film, a quantum dot polarizer using a light-emitting composite film layer of the present invention, and a liquid crystal display (LCD). In the diagram, ΔX and ΔY (before improvement) are color cast curves of a quantum dot polarizer (QD POL) using a prior art quantum dot film, and ΔX and ΔY (after improvement) are color cast curves obtained by using the light-emitting composite film layer of the present invention, and ΔX and ΔY (LCD) are color cast curves of the LCD. It is obvious from the diagram that the ΔX (after improvement) curve is closer to the ΔX (LCD) curve, and the ΔY (after improvement) curve is closer to the ΔY (LCD) curve. The optical performance of the quantum dot polarizer (QD POL) using the light-emitting composite film layer of the present invention is basically the same as that of the LCD.

The color cast and brightness of mini LED plus prior art quantum dot light-emitting diode (QLED) (hereinafter referred to as mini LED+QLED), wherein QLED is a self-luminous technology that does not require additional light sources, prior art QD POL (hereinafter referred to as QD POL before improvement), QD POL using light-emitting composite film layer of the present invention (hereinafter referred to as QD POL after improvement), and traditional LCD display technology (hereinafter referred to as LCD) are compared and as shown in the following table:

| Solution | Brightness viewing angles (½) | Color cast (60°, ΔY) |
|---|---|---|
| mini LED + QDEF | 125° | 0.11 |
| QD POL before improvement | 130° | 0.21 |
| QD POL after improvement | 125° | 0.05 |
| LCD | 55° | 0.04 |

The comparison of optical specifications of QD POL of the prior art, the QD POL using the light-emitting composite film layer of the present invention, the Mini LED+QDEF, and traditional LCD display technology can be seen from the table. The QD POL adopting the light-emitting composite film layer of the present invention maintains the advantage of a ½ brightness viewing angle, and the color cast is close to that of a traditional LCD, thereby allowing it to have advantages of mini LED technology and traditional LCD display technology.

An embodiment of the present invention also provides a backlight module. The backlight module includes any of the light-emitting composite film layers in the foregoing embodiments. The backlight module further includes an excitation device. The excitation device can be a blue LED. The blue light emitted by the blue LED excites the red quantum dots in the quantum dot film layer to emit red light. At the same time, the green quantum dots are excited to emit green light, and the red light, green light, and blue light are mixed into a white backlight with no color cast.

An embodiment of the present invention further provides a display device. The display device includes the backlight module of the foregoing embodiments.

The above are merely preferred embodiments of the present invention, and are not intended to limit the present invention. Any modification, equivalent replacement, simple improvement, etc. made on the substance of the present invention shall be included in the protection scope of the present invention.

INDUSTRIAL APPLICABILITY

The light-emitting composite film layer provided by the present invention includes a quantum dot film and a diffusion film layer covering at least one surface of the quantum dot film. The quantum dot film is dispersed with green light quantum dots, red light quantum dots, and light diffusion particles, and light diffusion particles are dispersed in the diffusion film layer. Light diffusion effect of light-diffusing particles is utilized to make blue light divergent to achieve the same brightness viewing angles as the red light and green light quantum dots, thereby reducing color cast and even eliminating color cast to solve the problem of color cast at large viewing angles that occurs when the conventional quantum dot film (QD-film) is applied to a display.

What is claimed is:

1. A light-emitting composite film layer, comprising a quantum dot film layer and a diffusion film layer, wherein the diffusion film layer is disposed on at least one surface of the quantum dot film layer, the quantum dot film layer comprises quantum dots and light diffusion particles dispersed therein, the quantum dots comprise green light quantum dots and red light quantum dots, the diffusion film layer comprises the light diffusion particles dispersed therein, and the light diffusion particles are inorganic nano-material having a refractive index greater than 2.0;

wherein the green light quantum dots comprise:
a luminescence nuclei comprising one or more of $ZnCdSe_2$, InP, and $Cd_2SSe$, an inorganic protective shell comprising one or more of CdS, ZnSe, $ZnCdS_2$, ZnS, and ZnO, and a surface ligand comprising one or more of amine, organic acid, mercaptan, and organic phosphorus; and the red light quantum dots comprise:
a luminescence nuclei comprising one or more of CdSe, $Cd_2SeTe$, and InAs, an inorganic protective shell comprising one or more of CdS, ZnSe, $ZnCdS_2$, ZnS, and ZnO, and a surface ligand comprising one or more of amine, organic acid, mercaptan, and organic phosphorus.

2. The light-emitting composite film layer according to claim 1, wherein the light diffusion particles are one or more of $TiO_2$, ZnS, and $ZrO_2$.

3. The light-emitting composite film layer according to claim 1, wherein the quantum dot film layer is obtained by adding the quantum dots, the light diffusion particles, a dispersant, and a first diluent to a first dispersion medium and mixing them uniformly, and mass of the quantum dots is 0.05 to 2.0 weight % relative to a total mass of the quantum dot film layer, mass of the light diffusion particles in the quantum dot film layer is 0.02 to 2.0 weight % relative to the total mass of the quantum dot film layer, mass of the first dispersion medium is 30 to 70 weight % relative to the total mass of the quantum dot film layer, mass of the dispersant is 30 to 70 weight % relative to the total mass of the quantum dot film layer, and mass of the diluent is 30 to 70 weight % relative to the total mass of the quantum dot film layer.

4. The light-emitting composite film layer according to claim 3, wherein the first dispersion medium is a pressure-sensitive adhesive or resin, the dispersant is alkane, olefin, toluene, chloroform, or propylene glycol methyl ether acetate, and the first diluent is ethyl acetate.

5. The light-emitting composite film layer according to claim 1, wherein the diffusion film layer is obtained by adding the light diffusion particles and a second diluent to a second dispersion medium and mixing them uniformly, and mass of the light diffusion particles in the diffusion film layer is 0.02 to 2.0 weight % relative to a total mass of the diffusion film layer, mass of the second diluent is 30 to 70 weight % relative to the total mass of the diffusion film layer, and mass of the second dispersion medium is 30 to 70 weight % relative to the total mass of the diffusion film layer.

6. The light-emitting composite film layer according to claim 5, wherein the second dispersion medium is polyvinyl alcohol, polysulfone amide, or resin, and the second diluent is water or alkane.

7. The light-emitting composite film layer according to claim 1, wherein a water-oxygen barrier layer is further disposed between the quantum dot film layer and the diffusion film layer.

8. A backlight module, comprising a light-emitting composite film layer comprising:
a quantum dot film layer and a diffusion film layer, wherein the diffusion film layer is disposed on at least one surface of the quantum dot film layer, the quantum dot film layer comprises quantum dots and light diffusion particles dispersed therein, the quantum dots comprise green light quantum dots and red light quantum dots, the diffusion film layer comprises the light diffusion particles dispersed therein, and the light diffusion particles are inorganic nano-material having a refractive index greater than 2.0:

wherein the green light quantum dots comprise:
a luminescence nuclei comprising one or more of $ZnCdSe_2$, InP, and $Cd_2SSe$, an inorganic protective shell comprising one or more of CdS, ZnSe, $ZnCdS_2$, ZnS, and ZnO, and a surface ligand comprising one or more of amine, organic acid, mercaptan, and organic phosphorus; and the red light quantum dots comprise:
a luminescence nuclei comprising one or more of CdSe, $Cd_2SeTe$, and InAs, an inorganic protective shell comprising one or more of CdS, ZnSe, $ZnCdS_2$, ZnS, and ZnO, and a surface ligand comprising one or more of amine, organic acid, mercaptan, and organic phosphorus.

9. A display device comprising a backlight module, the backlight module comprising a light-emitting composite film layer, wherein the light-emitting composite film layer comprises a quantum dot film layer and a diffusion film layer, the diffusion film layer is disposed on at least one surface of the quantum dot film layer, the quantum dot film layer comprises quantum dots and light diffusion particles dispersed therein, the quantum dots comprise green light quantum dots and red light quantum dots, the diffusion film layer comprises the light diffusion particles dispersed therein, and the light diffusion particles are inorganic nano-material having a refractive index greater than 2.0;

wherein the green light quantum dots comprise:
a luminescence nuclei comprising one or more of $ZnCdSe_2$, InP, and $Cd_2SSe$, an inorganic protective shell comprising one or more of CdS, ZnSe, $ZnCdS_2$, ZnS, and ZnO, and a surface ligand comprising one or more of amine, organic acid, mercaptan, and organic phosphorus; and the red light quantum dots comprise:
a luminescence nuclei comprising one or more of CdSe, $Cd_2SeTe$, and InAs, an inorganic protective shell comprising one or more of CdS, ZnSe, $ZnCdS_2$, ZnS, and ZnO, and a surface ligand comprising one or more of amine, organic acid, mercaptan, and organic phosphorus.

10. The display device according to claim 9, wherein the light diffusion particles are one or more of $TiO_2$, ZnS, and $ZrO_2$.

11. The display device according to claim 9, wherein the quantum dot film layer is obtained by adding the quantum dots, the light diffusion particles, the dispersant, and the first diluent to the first dispersion medium and mixing them uniformly, and mass of the quantum dots is 0.05 to 2.0 weight % relative to the total mass of the quantum dot film layer, mass of the light diffusion particles in the quantum dot film layer is 0.02 to 2.0 weight % relative to the total mass of the quantum dot film layer, mass of the first dispersion medium is 30 to 70 weight % relative to the total mass of the quantum dot film layer, mass of the dispersant is 30 to 70 weight % relative to the total mass of the quantum dot film layer, and mass of the diluent is 30 to 70 weight % relative to the total mass of the quantum dot film layer.

12. The display device according to claim 11, wherein the first dispersion medium is the pressure-sensitive adhesive or the resin, the dispersant is alkane, olefin, toluene, chloroform, or propylene glycol methyl ether acetate, and the first diluent is ethyl acetate.

13. The display device according to claim 9, wherein the diffusion film layer is obtained by adding the light diffusion particles and the second diluent to the second dispersion medium and mixing them uniformly, and mass of the light diffusion particles in the diffusion film layer is 0.02 to 2.0 weight % relative to the total mass of the diffusion film layer, mass of the second diluent is 30 to 70 weight % relative to the total mass of the diffusion film layer, and mass of the second dispersion medium is 30 to 70 weight % relative to the total mass of the diffusion film layer.

14. The display device according to claim 13, wherein the second dispersion medium is polyvinyl alcohol, polysulfone amide, or resin, and the second diluent is water or alkane.

15. The display device according to claim 9, wherein the water and oxygen barrier layer is further provided between the quantum dot film layer and the diffusion film layer.

* * * * *